United States Patent
Lee et al.

(10) Patent No.: US 10,734,681 B2
(45) Date of Patent: Aug. 4, 2020

(54) ELECTROLYTE FOR RECHARGEABLE LITHIUM BATTERY AND RECHARGEABLE LITHIUM BATTERY INCLUDING SAME

(71) Applicant: SAMSUNG SDI CO., LTD., Yongin-si, Gyeonggi-do (KR)

(72) Inventors: Ha-Rim Lee, Yongin-si (KR); Mi-Young Son, Yongin-si (KR); Hyun-Bong Choi, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 301 days.

(21) Appl. No.: 15/219,582

(22) Filed: Jul. 26, 2016

(65) Prior Publication Data

US 2017/0179528 A1    Jun. 22, 2017

(30) Foreign Application Priority Data

Dec. 16, 2015 (KR) .................. 10-2015-0180363

(51) Int. Cl.

| | |
|---|---|
| *H01M 6/16* | (2006.01) |
| *H01M 10/0567* | (2010.01) |
| *H01M 10/052* | (2010.01) |
| *H01M 10/056* | (2010.01) |
| *H01M 4/131* | (2010.01) |
| *H01M 4/525* | (2010.01) |
| *H01M 4/62* | (2006.01) |
| *H01M 4/66* | (2006.01) |
| *H01M 10/0525* | (2010.01) |
| *H01M 10/0568* | (2010.01) |
| *H01M 10/0569* | (2010.01) |
| *H01M 10/0587* | (2010.01) |
| *H01M 4/02* | (2006.01) |

(52) U.S. Cl.
CPC ....... *H01M 10/0567* (2013.01); *H01M 4/131* (2013.01); *H01M 4/525* (2013.01); *H01M 4/623* (2013.01); *H01M 4/625* (2013.01); *H01M 4/661* (2013.01); *H01M 10/052* (2013.01); *H01M 10/056* (2013.01); *H01M 10/0525* (2013.01); *H01M 10/0568* (2013.01); *H01M 10/0569* (2013.01); *H01M 10/0587* (2013.01); *H01M 2004/028* (2013.01); *H01M 2220/30* (2013.01); *H01M 2300/004* (2013.01); *H01M 2300/0017* (2013.01)

(58) Field of Classification Search
CPC .......... H01M 10/0567; H01M 10/052; H01M 10/056; H01M 10/0568; H01M 10/0569; H01M 10/0587; H01M 4/131; H01M 4/525; H01M 4/623; H01M 4/661; H01M 2004/028; H01M 2220/30; H01M 2300/0017; H01M 2300/004
See application file for complete search history.

(56) References Cited

U.S. PATENT DOCUMENTS

| | | | |
|---|---|---|---|
| 5,718,989 | A | 2/1998 | Aoki et al. |
| 9,093,716 | B2 * | 7/2015 | Tokuda ................ H01M 4/134 |
| 2010/0028771 | A1 | 2/2010 | Zhou et al. |
| 2010/0323240 | A1 | 12/2010 | Tsujioka et al. |
| 2014/0093787 | A1 | 4/2014 | Abe et al. |
| 2016/0126593 | A1 | 5/2016 | Abe |

FOREIGN PATENT DOCUMENTS

| | | | |
|---|---|---|---|
| EP | 2704246 | A1 | 3/2014 |
| EP | 2889947 | A1 | 7/2014 |
| EP | 2889947 | * | 2/2015 ........ H01M 10/0567 |
| JP | 3897387 | B2 | 3/2007 |
| WO | WO 2012/147818 | A1 | 11/2012 |
| WO | WO 2014/203912 | A1 | 11/2012 |

OTHER PUBLICATIONS

Extended European Search Report dated Dec. 7, 2016, of the corresponding European Patent Application No. 16186499.6.
Office Action dated Oct. 18, 2017 of the corresponding European Patent Application No. 16186499.6.

\* cited by examiner

*Primary Examiner* — Raymond Alejandro
(74) *Attorney, Agent, or Firm* — Lee IP Law, P.C.

(57) ABSTRACT

An electrolyte for a rechargeable lithium battery and a rechargeable lithium battery, the electrolyte including a lithium salt; an organic solvent; and an additive, wherein the additive includes $LiPO_2F_2$, and a compound represented by the following Chemical Formula 1:

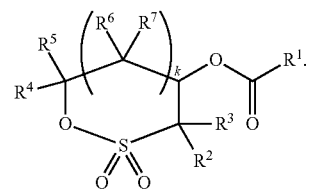

Chemical Formula 1

5 Claims, 3 Drawing Sheets

ELECTROLYTE FOR RECHARGEABLE LITHIUM BATTERY AND RECHARGEABLE LITHIUM BATTERY INCLUDING SAME

CROSS-REFERENCE TO RELATED APPLICATION

Korean Patent Application No. 10-2015-0180363, filed on Dec. 16, 2015, in the Korean Intellectual Property Office, and entitled: "Electrolyte for Rechargeable Lithium Battery and Rechargeable Lithium Battery Including Same," is incorporated by reference herein in its entirety.

BACKGROUND

1. Field

Embodiments relate to an electrolyte for a rechargeable lithium battery and a rechargeable lithium battery including the same.

2. Description of the Related Art

Recent developments in high-tech electronics have allowed electronic devices to become smaller and lighter in weight, which leads to an increase in portable electronic devices. As a power source for such portable electronic devices, the demands for batteries with high energy density are increasing and research on lithium rechargeable battery is underway.

The rechargeable lithium battery may be manufactured by an injecting electrolyte into an electrode assembly, which includes a positive electrode (including a positive active material capable of intercalating/deintercalating lithium) and a negative electrode (including a negative active material capable of intercalating/deintercalating lithium). An electrolyte may include an organic solvent in which a lithium salt is dissolved and may determine stability and performance of a rechargeable lithium battery.

SUMMARY

Embodiments are directed to an electrolyte for a rechargeable lithium battery and a rechargeable lithium battery including the same.

The embodiments may be realized by providing an electrolyte for a rechargeable lithium battery, the electrolyte including a lithium salt; an organic solvent; and an additive, wherein the additive includes $LiPO_2F_2$, and a compound represented by the following Chemical Formula 1:

Chemical Formula 1 wherein, in Chemical Formula 1, $R^1$ to $R^7$ are each independently a hydrogen atom, a substituted or unsubstituted C1 to C30 alkyl group, a substituted or unsubstituted C1 to C30 alkoxy group, a substituted or unsubstituted C2 to C30 alkenyl group, a substituted or unsubstituted C2 to C30 alkynyl group, a substituted or unsubstituted C3 to C30 cycloalkyl group, a substituted or unsubstituted C3 to C30 cycloalkenyl group, a substituted or unsubstituted C3 to C30 cycloalkynyl group, or a substituted or unsubstituted C6 to C30 aryl group, and k is 0 or 1.

The compound represented by Chemical Formula 1 may be present in an amount of about 0.5 wt % to about 3 wt % based on 100 wt % of the total electrolyte for a rechargeable lithium battery.

The compound represented by Chemical Formula 1 may be present in an amount of about 1 wt % to about 2 wt %, based on a total weight of the electrolyte for a rechargeable lithium battery.

The $LiPO_2F_2$ may be present in an amount of about 0.5 wt % to about 1.5 wt %, based on a total weight of the electrolyte for a rechargeable lithium battery.

The compound represented by Chemical Formula 1 may be present in an amount of about 50 parts by weight to about 300 parts by weight, based on 100 parts by weight of the $LiPO_2F_2$.

The compound represented by Chemical Formula 1 may be represented by one of the following Chemical Formula 2 or 3:

Chemical Formula 2

Chemical Formula 3 wherein, in Chemical Formulae 2 and 3, $R^1$ may be a hydrogen atom, a substituted or unsubstituted C1 to C30 alkyl group, a substituted or unsubstituted C1 to C30 alkoxy group, a substituted or unsubstituted C2 to C30 alkenyl group, a substituted or unsubstituted C2 to C30 alkynyl group, a substituted or unsubstituted C3 to C30 cycloalkyl group, a substituted or unsubstituted C3 to C30 cycloalkenyl group, a substituted or unsubstituted C3 to C30 cycloalkynyl group, or a substituted or unsubstituted C6 to C30 aryl group.

In Chemical Formulae 2 and 3, $R^1$ may be a hydrogen atom, a substituted or unsubstituted C1 to C10 alkyl group, a substituted or unsubstituted C1 to C10 alkoxy group, a substituted or unsubstituted C2 to C10 alkenyl group, or a substituted or unsubstituted C2 to C10 alkynyl group.

The organic solvent may include a carbonate-based compound and an ester-based compound.

The compound represented by Chemical Formula 1 may be represented by one of the following Chemical Formulae 1a to 1h:

Chemical Formula 1a

Chemical Formula 1b

Chemical Formula 1c

Chemical Formula 1d

Chemical Formula 1e

Chemical Formula 1f

Chemical Formula 1g

Chemical Formula 1h

The embodiments may be realized by providing a rechargeable lithium battery including a positive electrode, a negative electrode, and the electrolyte according to an embodiment.

The positive electrode may include a positive active material represented by Chemical Formula 4:

Chemical Formula 4 wherein, in Chemical Formula 4, $0.90 \leq a \leq 1.8$, $0 \leq b \leq 0.9$, $0 \leq c \leq 0.5$, $0.001 \leq d \leq 0.1$, E is Co, Mn, or a combination thereof, and G is Al, Cr, Mn, Fe, Mg, La, Ce, Sr, V, or a combination thereof.

BRIEF DESCRIPTION OF THE DRAWINGS

Features will be apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, when a definition is not otherwise provided, the term "substituted" refers to one substituted with a substituent selected from a halogen (F, Br, Cl or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof, instead of hydrogen of a compound.

As used herein, when a definition is not otherwise provided, the term 'hetero' refers to one including 1 to 3 hetero atoms selected from N, O, S, and P.

Hereinafter, an electrolyte for a rechargeable lithium battery according to one embodiment is explained.

An electrolyte according to the present embodiment may include a lithium salt, an organic solvent, and an additive.

The additive may include, e.g., a compound represented by Chemical Formula 1 and $LiPO_2F_2$.

[Chemical Formula 1]

In Chemical Formula 1, $R^1$ to $R^7$ may each independently be or include, e.g., a hydrogen atom, a substituted or unsubstituted C1 to C30 alkyl group, a substituted or unsubstituted C1 to C30 alkoxy group, a substituted or unsubstituted C2 to C30 alkenyl group, a substituted or unsubstituted C2 to C30 alkynyl group, a substituted or unsubstituted C3 to C30 cycloalkyl group, a substituted or unsubstituted C3 to C30 cycloalkenyl group, a substituted or unsubstituted C3 to C30 cycloalkynyl group, or a substituted or unsubstituted C6 to C30 aryl group.

k may be 0 or 1.

The electrolyte for a rechargeable lithium battery may include, e.g., a compound represented by Chemical Formula 1 and $LiPO_2F_2$ as an additive. Accordingly, the electrolyte may help control a DC-IR increase rate at a predetermined level and may help suppress resistance after being allowed to stand at a high temperature, and thus may help improve stability of a battery.

In an implementation, the additive may include one or more kinds of a cyclic sulfonate ester compound represented by Chemical Formula 1. When k is 0 in Chemical Formula 1, the compound includes a 5-membered ring structure, and when k is 1, the compound includes a 6-membered ring structure.

In an implementation, the compound represented by Chemical Formula 1 may be represented by one of the following Chemical Formula 2 or Chemical Formula 3.

[Chemical Formula 2]

[Chemical Formula 3]

In Chemical Formulae 2 and 3, $R^1$ may be or may include, e.g., a hydrogen atom, a substituted or unsubstituted C1 to C30 alkyl group, a substituted or unsubstituted C1 to C30 alkoxy group, a substituted or unsubstituted C2 to C30 alkenyl group, a substituted or unsubstituted C2 to C30 alkynyl group, a substituted or unsubstituted C3 to C30 cycloalkyl group, a substituted or unsubstituted C3 to C30 cycloalkenyl group, a substituted or unsubstituted C3 to C30 cycloalkynyl group, or a substituted or unsubstituted C6 to C30 aryl group.

In an implementation, in Chemical Formulae 2 and 3, $R^1$ may be or may include, e.g., a hydrogen atom, a substituted or unsubstituted C1 to C10 alkyl group, a substituted or unsubstituted C1 to C10 alkoxy group, a substituted or unsubstituted C2 to C10 alkenyl group, or a substituted or unsubstituted C2 to C10 alkynyl group.

In an implementation, the compound represented by Chemical Formula 1 may be represented by one of Chemical Formulae 1a to 1h.

[Chemical Formula 1a]

[Chemical Formula 1b]

[Chemical Formula 1c]

[Chemical Formula 1d]

[Chemical Formula 1e]

[Chemical Formula 1f]

[Chemical Formula 1g]

[Chemical Formula 1h]

In an implementation, the cyclic sulfonate ester compound represented by Chemical Formula 1 may be present in the electrolyte in an amount of about 0.5 wt % to about 3 wt %, e.g., about 1 wt % to about 2 wt %, based on a total weight (100 wt %) of the electrolyte for a rechargeable lithium battery. When the cyclic sulfonate ester compound is used or included within the range, an excellent effect of suppressing resistance when being allowed to stand at a high temperature may be obtained.

As described above, the additive may include the compound represented by Chemical Formula 1 and the $LiPO_2F_2$. Accordingly, battery stability may be further improved when being allowed to stand at a high temperature.

Regarding a ratio of components in the additive, the compound represented by Chemical Formula 1 may be present in an amount of, e.g., about 50 parts by weight to about 300 parts by weight, based on 100 parts by weight of the $LiPO_2F_2$.

In an implementation, the $LiPO_2F_2$ may be present in an amount of about 0.5 wt % to about 1.5 wt %, e.g., about 0.5 wt % to about 1.5 wt %, based on a total weight (100 wt %) of the electrolyte for a rechargeable lithium battery.

As an electrolyte component, the organic solvent may include, e.g., a carbonate-based compound, an ester-based compound, an ether-based compound, a ketone-based compound, an alcohol-based compound, or a combination thereof. Of these, with a view toward helping to control a viscosity of a solvent, the carbonate-based compound and the ester-based compound may be mixed.

The carbonate-based compound may include, e.g., diethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), or a combination thereof.

The ester-based compound may include, e.g., methyl acetate, ethyl acetate, n-propyl acetate, methylpropionate, ethylpropionate, γ-butyrolactone, decanolide, valerolactone, mevalonolactone, caprolactone, or the like. Among these, the ethylpropionate is a solvent having low viscosity, and may be used with the carbonate-based compound to thus help adjust viscosity.

In an implementation, the carbonate-based compound and the ester-based compound may be mixed in a volume ratio of about 10:0 to about 5:5, e.g., from about 10:0 to about 7:3. Accordingly, the additive may have versatile application as a mixture of the carbonate-based compound with the ester-based compound as well as the carbonate-based compound alone. In addition, when mixed within the volume ratio range, excellent cell performance depending on a purpose of a battery may be obtained by appropriately adjusting viscosity of the solvent.

The ether-based compound may include, e.g., dibutylether, tetraglyme, diglyme, dimethoxyethane, 2-methyltetrahydrofuran, tetrahydrofuran, or the like. The ketone-based compound may include, e.g., cyclohexanone or the like. The alcohol-based compound may include, e.g., ethanol, isopropyl alcohol, or the like.

The organic solvent may further include an aromatic hydrocarbon-based solvent as well as the carbonate-based solvent. The carbonate-based solvent and aromatic hydrocarbon-based solvent may be mixed together in a volume ratio of about 1:1 to about 30:1.

The aromatic hydrocarbon-based organic solvent may be an aromatic hydrocarbon-based compound represented by Chemical Formula 1.

[Chemical Formula 1]

In Chemical Formula 1, $R_1$ to $R_6$ are the same or different and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive of vinylene carbonate, or an ethylene carbonate-based compound represented by Chemical Formula 2, to improve cycle life.

[Chemical Formula 2]

In Chemical Formula 2, $R_7$ and $R_8$ are the same or different and may be each independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, vinylethylene carbonate, fluoroethylene carbonate, and the like.

The amount of the additive for improving cycle life may be flexibly used within an appropriate range.

In addition, the electrolyte may further include a nitrile-based additive such as succinonitrile, adiponitrile, or a combination thereof.

As an electrolyte component, the lithium salt may be dissolved in the organic solvent and may serve as a lithium ion source in a battery. Thus, the lithium salt may play a role of making the rechargeable lithium battery basically operate and promoting movement of lithium ions between positive and negative electrodes.

The lithium salt may include, e.g., LiPF$_6$, LiBF$_4$, LiSbF$_6$, LiAsF$_6$, LiN (SO$_3$C$_2$F$_5$)$_2$, LiC$_4$F$_9$SO$_3$, LiClO$_4$, LiAlO$_2$, LiAlCl$_4$, LiN(C$_x$F$_{2x+1}$SO$_2$(C$_y$F$_{2y+1}$SO$_2$) (in which the x and y are natural numbers, e.g., an integer of 1 to 20), LiCl, LiI, LiB(C$_2$O$_4$)$_2$ (lithium bisoxalatoborate (LiBOB)), lithium bis (fluorosulfonyl)imide (LiFSI), or a combination thereof.

The concentration of the lithium salt may be, e.g., about 0.1M to about 2.0 M. When the concentration of the lithium salt is within the range, the electrolyte may have appropriate conductivity and viscosity and thus, may effectively move lithium ions and show excellent electrolyte performance.

In an implementation, the viscosity of the electrolyte may be less than or equal to about 8 cP, e.g., less than or equal to about 5 cP or about 4 to about 5 cP. When the electrolyte has viscosity within the range, excellent cell performance and specifically, excellent rate capability, may be obtained.

In an implementation, the ion conductivity of the electrolyte may be greater than or equal to about 5 mS/cm, e.g., about 5 mS/cm to about 12 mS/cm or about 6 mS/cm to about 9 mS/cm. When the electrolyte has ion conductivity within the range, excellent cycle-life characteristics may be obtained.

In one embodiment, the electrolyte may further include fluoroethylene carbonate, LiBF$_4$, lithium bisoxalatoborate, and succinic nitrile.

Hereinafter, a rechargeable lithium battery including the electrolyte is described referring to FIG. 1.

Figure 1:
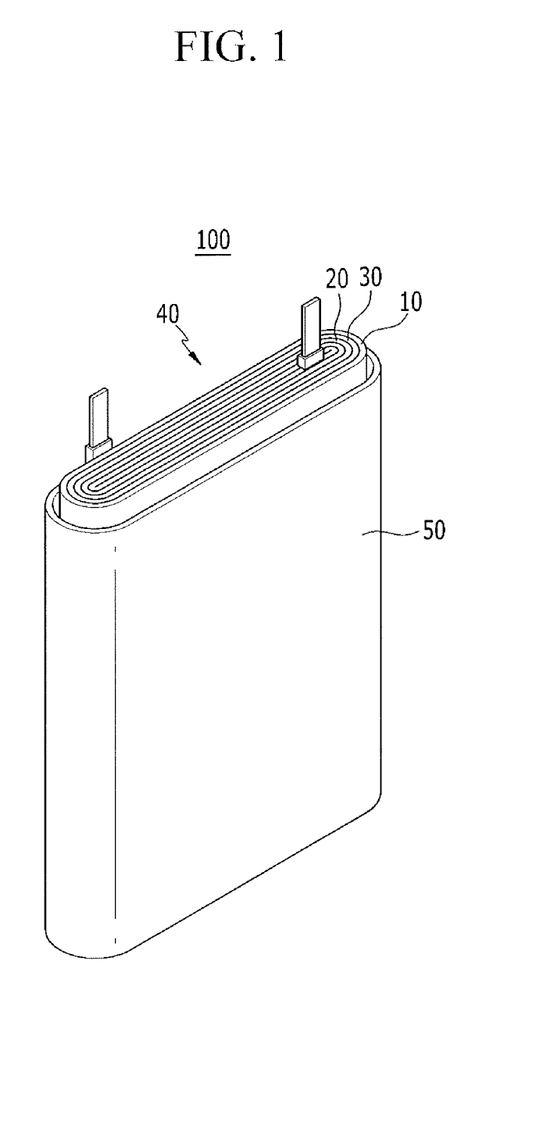
FIG. 1 illustrates an exploded perspective view showing a rechargeable lithium battery according to one embodiment.

FIG. 1 illustrates an exploded perspective view of a rechargeable lithium battery according to one embodiment. FIG. 1 shows a prismatic rechargeable lithium battery according to one embodiment. In an implementation, the rechargeable lithium battery according to an embodiment may have various shapes such as cylinder or pouch-type.

Referring to FIG. 1, a rechargeable lithium battery 100 according to one embodiment may include an electrode assembly 40 (in which a separator 30 is interposed between a positive electrode 10 and a negative electrode 20), and a case 50 (housing the electrode assembly 40). The positive electrode 10, the negative electrode 20 and the separator 30 may be impregnated in an electrolyte.

The electrolyte may be the same as described above.

The positive electrode may include a current collector and a positive active material layer formed on the current collector. The positive active material layer may include a positive active material, and optionally a binder and a conductive material.

The current collector may include, e.g., Al (aluminum).

The positive active material may include lithiated intercalation compounds that reversibly intercalate and deintercalate lithium ions. In an implementation, at least one composite oxide of lithium and a metal of cobalt, manganese, nickel, or a combination thereof may be used, and examples thereof may be a compound represented by one of the following Chemical Formulae:

Li$_a$A$_{1-b}$B$_b$D$_2$ (0.90≤a≤1.8 and 0≤b≤0.5); Li$_a$E$_{1-b}$B$_b$O$_{2-c}$D$_c$ (0.90≤a≤1.8, 0≤b≤0.5, 0≤c≤0.05); Li$_a$E$_{2-b}$B$_b$O$_{4-c}$D$_c$ (0.90≤a≤1.8, 0≤b≤0.5, 0≤c≤0.05); Li$_a$Ni$_{1-b-c}$Co$_b$B$_c$D$_\alpha$ (0.90≤a≤1.8, 0≤b≤0.5, 0≤c≤0.05, 0<α≤2); Li$_a$Ni$_{1-b-c}$Co$_b$B$_c$O$_{2-\alpha}$F$_\alpha$ (0.90≤a≤1.8, 0≤b≤0.5, 0≤c≤0.05, 0<α<2); Li$_a$Ni$_{1-b-c}$Co$_b$B$_c$O$_{2-\alpha}$F$_2$ (0.90≤a≤1.8, 0≤b≤0.5, 0≤c≤0.05, 0<α<2); Li$_a$Ni$_{1-b-c}$Mn$_b$B$_c$D$_\alpha$ (0.90≤a≤1.8, 0≤b≤0.5, 0≤c≤0.05, 0<α≤2); Li$_a$Ni$_{1-b-c}$Mn$_b$B$_c$O$_{2-\alpha}$F$_\alpha$ (0.90≤a≤1.8, 0≤b≤0.5, 0≤c≤0.05, 0<α<2); Li$_a$Ni$_{1-b-c}$Mn$_b$B$_c$O$_{2-\alpha}$F$_2$ (0.90≤a≤1.8, 0≤b≤0.5, 0≤c≤0.05, 0<α<2); Li$_a$Ni$_b$E$_c$G$_d$O$_2$ (0.90≤a≤1.8, 0≤b≤0.9, 0≤c≤0.5, 0.001≤d≤0.1); Li$_a$Ni$_b$Co$_c$Mn$_d$G$_e$O$_2$ (0.90≤a≤1.8, 0≤b≤0.9, 0≤c≤0.5, 0≤d≤0.5, 0.001≤e≤0.1); Li$_a$NiG$_b$O$_2$ (0.90≤a≤1.8, 0.001≤b≤0.1); Li$_a$CoG$_b$O$_2$ (0.90≤a≤1.8, 0.001≤b≤0.1); Li$_a$MnG$_b$O$_2$ (0.90≤a≤1.8, 0.001≤b≤0.1); Li$_a$Mn$_2$G$_b$O$_4$ (0.90≤a≤1.8, 0.001≤b≤0.1); QO$_2$; QS$_2$; LiQS$_2$; V$_2$O$_5$; LiV$_2$O$_5$; LiIO$_2$; LiNiVO$_4$; Li$_{(3-f)}$J$_2$(PO$_4$)$_3$ (0≤f≤2); Li$_{(3-f)}$Fe$_2$(PO$_4$)$_3$ (0≤f≤2); and LiFePO$_4$.

In the above chemical formulae, A may be Ni, Co, Mn, or a combination thereof; B may be Al, Ni, Co, Mn, Cr, Fe, Mg, Sr, V, a rare earth element, or a combination thereof; D may be O, F, S, P, or a combination thereof; E may be Co, Mn, or a combination thereof; F may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof.

For example, the positive active material may be a NCA-based material represented by Li$_a$Ni$_b$E$_c$G$_d$O$_2$ (wherein 0.90≤a≤1.8, 0≤b≤0.9, 0≤c≤0.5, 0.001≤d≤0.1, E is Co, Mn, or a combination thereof, and G is Al, Cr, Mn, Fe, Mg, La, Ce, Sr, V, or a combination thereof).

In an implementation, the positive active material may include, e.g., lithium cobalt oxide, lithium nickel cobalt manganese oxide, lithium nickel cobalt aluminum oxide, or a combination thereof.

The binder may help improve binding properties of positive active material particles with one another and with a current collector. Examples of the binder may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material may help improve conductivity of an electrode. A suitable electrically conductive material that does not cause a chemical change may be used as a conductive material. Specific examples of the conductive material may be a carbon-based material such as natural graphite, artificial graphite, carbon black, acetylene black, ketjen black, denka black, a carbon fiber and the like; a metal-based material of a metal powder or a metal fiber including copper, nickel, aluminum, silver, and the like; a conductive polymer such as a polyphenylene derivative; or a mixture thereof. The negative electrode may include a current collector and a negative active material layer formed on the current collector.

In an implementation, the current collector may be a copper foil.

In an implementation, the negative active material layer may include a negative active material, and optionally may further include a binder and/or a conductive material.

In an implementation, the negative active material may include a material that reversibly intercalates/deintercalates lithium ions, a lithium metal, a lithium metal alloy, a material being capable of doping and dedoping lithium, or a transition metal oxide.

The material that reversibly intercalates/deintercalates lithium ions may be a carbon material which is any generally-used carbon-based negative active material rechargeable lithium battery.

The material being capable of doping and dedoping lithium may include Si, SiO$_x$ (0<x<2), a Si—C composite, a Si—Y' alloy (wherein Y' is an element selected from an alkali metal, an alkaline-earth metal, Group 13 to 16 elements, a transition metal, a rare earth element and combination thereof, and not Si), Sn, $SnO_2$, a Sn—C composite, a Sn—Y alloy (wherein Y is an element selected from an alkali metal, an alkaline-earth metal, Group 13 to 16 elements, a transition metal, a rare earth element, and a combination thereof, and not Sn), and the like, and at least one of these may be mixed with $SiO_2$. The element, Y', may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The binder may help improve binding properties of negative active material particles with one another and with a current collector.

The binder includes a non-water-soluble binder, a water-soluble binder, or a combination thereof. The non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder includes a styrene-butadiene rubber, an acrylated styrene-butadiene rubber, sodium polyacrylate, a copolymer of propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity.

The cellulose-based compound includes one or more of carboxylmethyl cellulose, hydroxypropylmethyl cellulose, methyl cellulose, or alkali metal salts thereof. The alkali metal may be Na, K, or Li. The cellulose-based compound may be included in an amount of about 0.1 parts by weight to about 3 parts by weight based on 100 parts by weight of the negative active material.

The conductive material may help improve electrical conductivity of an electrode. A suitable electrically conductive material that does not cause a chemical change may be used as a conductive material. The conductive material is included to provide electrode conductivity. Any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The positive electrode and the negative electrode may be manufactured by a method including mixing each active material, a binder, and a conductive material to provide an active material composition, and coating the composition on a current collector. The solvent may include, e.g., N-methylpyrrolidone or the like. When the binder is an aqueous binder, the solvent may be water.

The separator may include suitable materials that separate a negative electrode from a positive electrode and provide a transporting passage for lithium ions. For example, the separator may have a low resistance to ion transportation and an excellent impregnation for an electrolyte. For example, it may be selected from a glass fiber, polyester, polyethylene, polypropylene, polytetrafluoroethylene (PTFE), or a combination thereof. It may have a form of a non-woven fabric or a woven fabric.

A rechargeable lithium battery including the above electrolyte may exhibit excellent stability as well as improve cell performance such as allowed-to-stand characteristics at a high temperature.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Manufacture of Rechargeable Lithium Battery Cell

Example 1

$LiCoO_2$, polyvinylidene fluoride, and carbon black in a weight ratio of 96:2:2 were put in an N-methylpyrrolidone (NMP) solvent, preparing a slurry. The slurry was coated on an aluminum (Al) thin film and dried, manufacturing a positive electrode.

In addition, graphite, carboxymethyl cellulose, and styrene-butadiene rubber in a weight ratio of 98:1:1 were put in distilled water, preparing a slurry. The slurry was coated on a copper foil and then dried and compressed, manufacturing a negative electrode.

An electrolyte had the following composition.
(Electrolyte Composition)
Salt: 1.5 M $LiPF_6$
Solvent: ethylene carbonate:ethyl methyl carbonate:dimethyl carbonate (volume ratio=2:1:7)
Additive I: 8 wt % of fluoroethylene carbonate (FEC), 0.2 wt % of $LiBF_4$, 1 wt % of lithium bisoxalatoborate (LiBOB), and 0.5 wt % of succinic nitrile (SN)
Additive II 1 wt % of $LiPO_2F_2$ and 1 wt % of a compound represented by the following Chemical Formula 1a
Here, "wt %" in the electrolyte composition was based on the total weight of the electrolyte.

[Chemical Formula 1a]

The manufactured positive and negative electrodes, the electrolyte, and a separator made of a polyethylene material were used, manufacturing a rechargeable lithium battery cell.

Comparative Example 1

A rechargeable lithium battery cell was manufactured according to the same method as Example 1 except for not adding any of the $LiPO_2F_2$ and the compound represented by Chemical Formula 1a, i.e., omitting the additive II.

Comparative Example 2

A rechargeable lithium battery cell was manufactured according to the same method as Example 1 except for not adding, i.e., omitting, the $LiPO_2F_2$ in the additive II, and adding only 2 wt % of the compound represented by Chemical Formula 1a.

Comparative Example 3

A rechargeable lithium battery cell was manufactured according to the same method as Example 1 except for not using, i.e., omitting, the compound represented by Chemical Formula 1a in the additive II, and adding only 2 wt % of the compound represented by Chemical Formula 1a.

Evaluation 1: EIS Measurement

Electrochemical impedance spectroscopy (EIS) of the rechargeable lithium battery cells according to Example 1 and Comparative Examples 1 to 3 was measured.

The electrochemical impedance spectroscopy (EIS) was measured by using a Potentiostat equipment in a range of $10^6$ Hz to 0.1 Hz.

Figure 2:
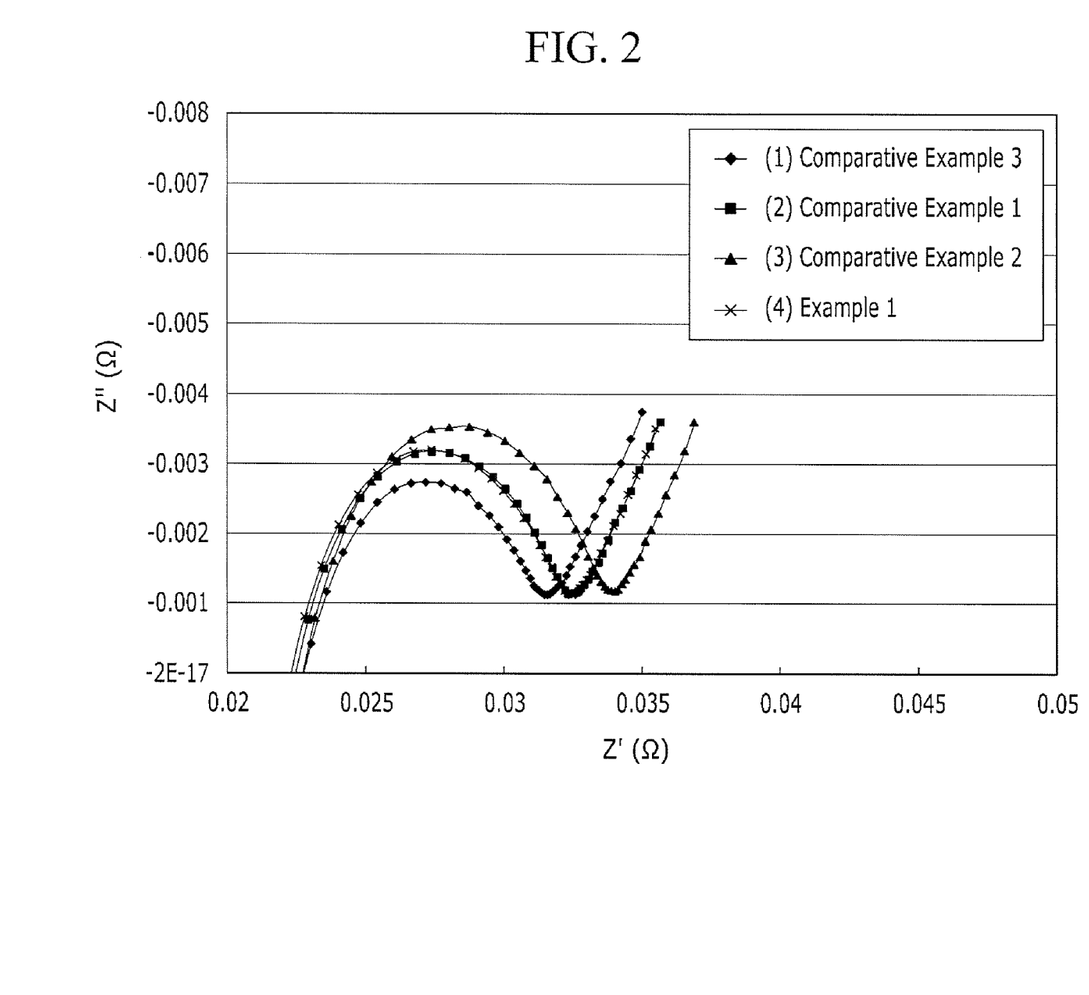
FIG. 2 illustrates a graph showing the initial EIS result of rechargeable lithium battery cells according to Example 1 and Comparative Examples 1 to 3.
Figure 3:
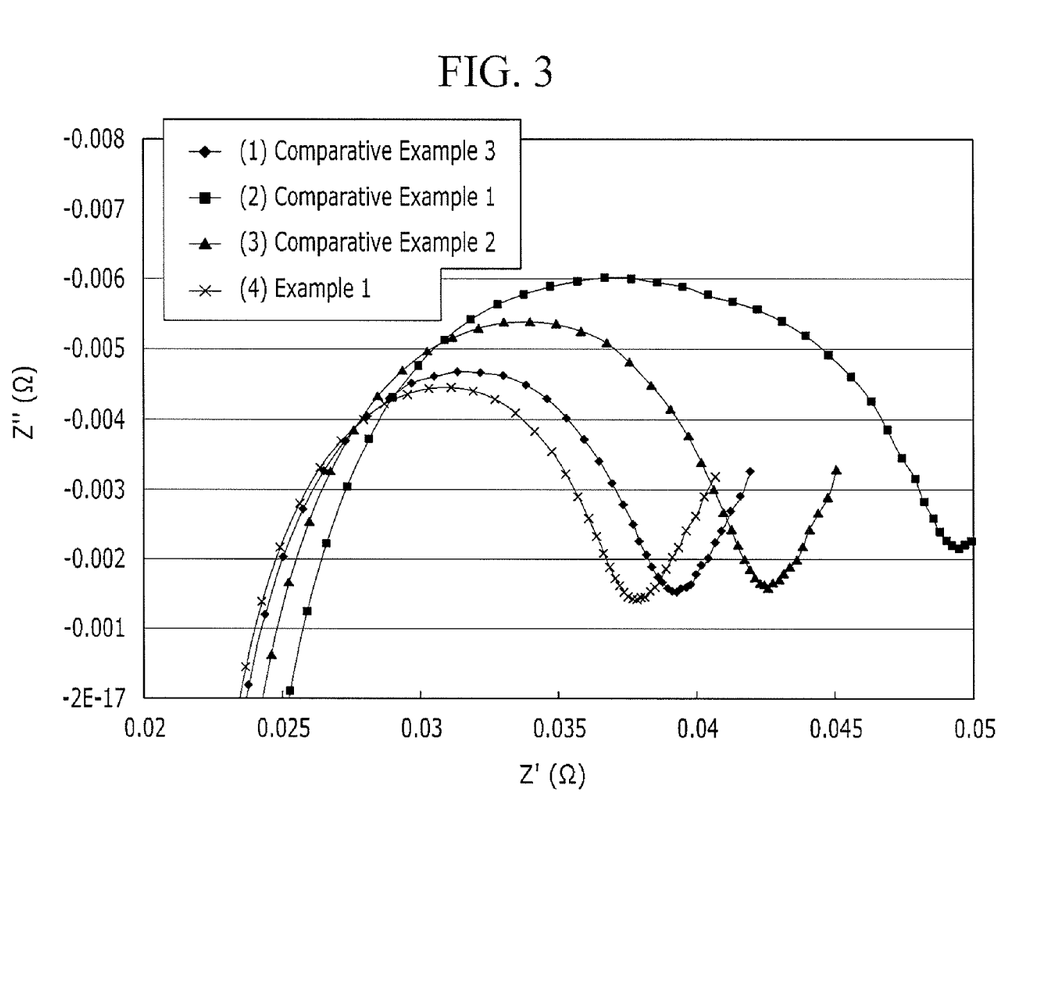
FIG. 3 illustrates a graph showing the EIS results of the rechargeable lithium battery cells according to Example 1 and Comparative Examples 1 to 3 after being allowed to stand for 30 days.

The results are provided in FIGS. 2 and 3.

FIG. 2 illustrates a graph showing the initial EIS results of the rechargeable lithium battery cells according to Example 1 and Comparative Examples 1 to 3, and FIG. 3 illustrates a graph showing the EIS results of the rechargeable lithium battery cells according to Example 1 and Comparative Examples 1 to 3 after being allowed to stand at high temperature for 30 days.

Referring to FIGS. 2 and 3, the rechargeable lithium battery cell including the $LiPO_2F_2$ and the compound represented by Chemical Formula 1a according to Example 1 were the most suppressed from resistance after being allowed to stand at a high temperature for 30 days. Herein, the high temperature was 60° C. The diameter of a semicircle in the EIS graph indicates resistance on the interface of the positive and negative electrodes after allowed to stand at a high temperature, and a smaller diameter of the semicircle indicates smaller resistance.

Evaluation 2: DC-IR

DC-IR of the rechargeable lithium battery cells according to Example 1 and Comparative Examples 1 to 3 was measured.

Initial capacity and DC-IR (Direct current internal resistance) of the rechargeable lithium battery cells of Example 1 and Comparative Example 1 to 3 were measured by using Potentiostat equipment. Subsequently, the rechargeable lithium battery cells according to Example 1 and Comparative Exampled 1 to 3 were allowed to stand at 60° C. for 20 days, and their retention capacities, recovery capacities, and DC-IR's were measured, and their DC-IR increase rates (%) were obtained according to Calculation 1.

[Calculation 1]

The cells were charged at 1 A, 4.2 V, and 100 mA in a standard environment and then, allowed to stand in an open circuit for 10 minutes.

2. Subsequently, the cells were discharged ((ⓐ) 4 A 10 sec. (ⓑ) 1 A 10 sec. (ⓒ) 4 A 4 sec)

3. The current and voltage of the cells were measured at 15 seconds and 23 seconds and used to calculate resistance ($\Delta R = \Delta V/\Delta I$), and the resistance was compared with Ref. resistance, calculating a DC-IR increase rate.

Subsequently, initial average DC-IR's and each average DC-IR's after allowed to stand at 60° C. for 20 days of the rechargeable lithium battery cells according to Example 1 and Comparative Examples 1 to 3 were obtained.

The results are provided in Table 1.

TABLE 1

| Electrolyte composition | Initial time | | After being allowed to stand at 60° C. for 20 days | | | | Average DC-IR | |
|---|---|---|---|---|---|---|---|---|
| | Capacity (mAh) | DC-IR (Ohm) | Retention Capacity | Recovery Capacity | DC-IR | Increase rate (%) | Initial time | After 20 days |
| Example 1 | 3473 | 36.1 | 3193 | 3347 | 37.7 | 104 | 36.1 | 37.7 |
| | 3467 | 36.1 | 3189 | 3343 | 37.8 | 105 | | |
| Comparative Example 1 | 3465 | 36.5 | 3181 | 3343 | 43.0 | 118 | 35.8 | 42.9 |
| | 3468 | 35.1 | 3192 | 3355 | 42.8 | 122 | | |
| Comparative Example 2 | 3474 | 36.5 | 3200 | 3359 | 39.4 | 108 | 36.4 | 39.5 |
| | 3472 | 36.4 | 3196 | 3354 | 39.7 | 109 | | |
| Comparative Example 3 | 3452 | 35.5 | 3174 | 3326 | 38.3 | 108 | 35.5 | 38.2 |
| | 3470 | 35.5 | 3192 | 3347 | 38.2 | 108 | | |

Referring to Table 1, the rechargeable lithium battery cell including the $LiPO_2F_2$ and the compound represented by Chemical Formula 1a according to Example 1 exhibited the lowest DC-IR increase rate and the lowest average DC-IR after being allowed to stand at 60° C. for 20 days.

By way of summation and review, $LiPF_6$ may be used as the lithium salt for the electrolyte, may react with an electrolyte solvent, may promote depletion of the solvent, and thus may generate a large amount of gas. The $LiPF_6$ may be decomposed, may produce LiF and $PF_5$, and thus may cause depletion of the electrolyte in the battery. Accordingly, performance of the battery at a high temperature and safety of the battery may be affected.

Accordingly, an electrolyte may help suppress the side reaction of the lithium salt and may help improve battery performance.

The embodiments may provide an electrolyte for a rechargeable lithium battery capable of maintaining battery performance as well as securing safety.

According to an embodiment, a rechargeable lithium battery maintaining performance as well as securing safety may be realized.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated.

Accordingly, it will be understood by those of skill in the art that various changes in form and details may be made without departing from the spirit and scope of the present invention as set forth in the following claims.

DESCRIPTION OF SYMBOLS

100: rechargeable lithium battery 10: positive electrode 20: negative electrode 30: separator 40: electrode assembly 50: case

What is claimed is:

1. An electrolyte for a rechargeable lithium battery, the electrolyte consisting of:
a lithium salt;
an organic solvent;
0.5 wt % to 1.5 wt % of $LiPO_2F_2$;
1 wt % to 2 wt % of a compound represented by the following Chemical Formula 1 or Chemical Formula 2, in which wt % is based on a total weight of the electrolyte for a rechargeable lithium battery;
fluoroethylene carbonate;
$LiBF_4$;
lithium bisoxalatoborate; and
succinic nitrile, Chemical Formula 1

Chemical Formula 2 wherein, in Chemical Formulae 1 and 2,
$R^1$ is an unsubstituted C1 to C30 alkyl group.

2. The electrolyte as claimed in claim 1, wherein the organic solvent includes a carbonate-based compound and an ester-based compound.

3. The electrolyte as claimed in claim 1, wherein the compound represented by Chemical Formula 1 or 2 is represented by one of the following Chemical Formulae 1a to 1g or 2a:

Chemical Formula 1a

Chemical Formula 1b

Chemical Formula 1c

Chemical Formula 1d

Chemical Formula 1e

Chemical Formula 2a

Chemical Formula 1f

Chemical Formula 1g

4. A rechargeable lithium battery, comprising
a positive electrode,
a negative electrode, and
the electrolyte as claimed in claim 1.

5. The rechargeable lithium battery as claimed in claim 4, wherein the positive electrode includes a positive active material represented by Chemical Formula 4:

$$Li_aNi_bE_cG_dO_2$$ Chemical Formula 4 wherein, in Chemical Formula 4,
$0.90 \leq a \leq 1.8$, $0 \leq b \leq 0.9$, $0 \leq c \leq 0.5$, $0.001 \leq d \leq 0.1$,
E is Co, Mn, or a combination thereof, and
G is Al, Cr, Mn, Fe, Mg, La, Ce, Sr, V, or a combination thereof.

* * * * *